Patented June 25, 1940

2,206,007

UNITED STATES PATENT OFFICE 2,206,007

PROCESS FOR THE PRODUCTION OF CONVERSION PRODUCTS FROM CARBONACEOUS MATERIALS

Otto Liebknecht, Neubabelsberg, Germany, assignor to The Permutit Company, New York, N. Y., a corporation of Delaware No Drawing. Application March 8, 1935, Serial No. 10,127. In Germany April 13, 1934

15 Claims. (Cl. 210—24)

It has been found that conversion products are obtainable by the action of sulphuric acid on carbonaceous substances such as, for example, wood, commercial lignite, peat, charcoal, coals of the various types, cokes and similar materials, or other humic materials, or materials containing humic matter, which conversion products may be used for numerous purposes, and more particularly for conditioning water.

The reaction is characterized by the fact that the carbonaceous humic substances, if they are not already black, as for example, wood or lignite, undergo darkening in the course of which they become black or almost black, and that they swell up so that the volume of the treated mass, when, for example, lignite or charcoal is used, is approximately doubled. First of all, however, there is, besides this physical modification, also a chemical change which imparts to the substances properties not known heretofore. The chemical change probably is due to the fact that, in acting upon the humic matter, the sulfuric acid not only has an oxidizing action but a variety of other actions tending to the production of compounds of, apparently, high molecular weight; compounds having the character of acids, alcohols or esters. By substituting reactions there are produced compounds containing $SO_3$ in organic combination; sulfonic acids, complex sulfuric acids, sulfuric acid esters, etc. Complex sulfuric acids are mostly also esters, one hydroxyl of $H_2SO_4$ being esterified. The new compounds in addition may also carry other ester groups, alcohol groups, etc. All these compounds produced by treating humic materials with sulfuric acid may here be called sulfated humic compounds. The oxidizing and sulfating action of the sulfuric acid is indicated by the formation of sulfurous acid during the reaction, i. e., a reduction of the sulfuric acid and an oxidation of the carbonaceous material. At any rate, the insoluble compounds obtained have properties which may be explained in this manner. They have the power to extract cations from aqueous solutions not only of salts of weak acids but also of salts which contain as an anion a strong acid radical such as $SO_4''$, $NO_3'$ or $Cl'$. Accordingly, it is clear that anions of weaker acids such as, for example, acetic and similar organic acids, do not reduce the extraction of the cations. The acid being liberated from the salt may have a pH of 2.8 or even less, for example 2, so that it is possible to liberate acid from salts. Thus, an ion exchange takes place in which the hydrogen ion of the new product is exchanged for the cation of a salt.

The new products are also capable of ion exchange, as in softening water. For instance, if they have been charged with sodium ions, an exchange for calcium ions can be obtained by bringing the solution of a calcium salt in contact with the material charged with sodium. Then the calcium ions are exchanged for the sodium ions so that a solution of the corresponding sodium salt is formed which solution may, under certain conditions, be free of calcium. In the course of use in practice it was found that for instance hard water, upon passing through the hydrogen ion exchange substance, may completely lose its cations so that the effluent is a water which not only is free of hardness but which is entirely and completely free of salts and which merely contains the acids corresponding to the salts dissolved in the water that is, for example, carbonic acid, sulfuric acid, hydrochloric acid. Even these acids can be removed from the water by suitable further treatment, such as heating or precipitation or else electrodialysis.

Thus the new ion-exchanging material contains acidic hydrogen and forms salts with the alkalis or alkaline earths, which salts are insoluble and resist mineral acids of not too high a concentration.

The described sulfated humic materials can again be re-formed, when their capacity for extracting cations is exhausted, by regenerating them with stronger acids which have, for instance, a pH of about 1 or less. After washing these acids out the materials again display their original activity. Similarly, the salts of the acidic sulfated materials are re-formed in the case of ion exchange, as in water softening when for instance, sodium ion has been exchanged for calcium ion, by exchanging the calcium ions again with the sodium ions in a solution of a sodium salt; by the usual regenerating operation, treatment with a solution of common salt. It should be emphasized that this exchange reaction is naturally not limited to alkali salts or alkaline earth salts but that all salts can be exchanged in the same manner, even those of the heavy metals or other light metals.

In producing the new products of this invention, one proceeds, for example, as follows:

50 parts by weight of a commercial lignite having medium moisture content (15 per cent water) are finely crushed and mixed with 200 parts by weight of 93 per cent sulphuric acid. During the mixing the temperature rises to about 70–80° C.

The mixture is then further heated, preferably with stirring, until a temperature of approximately 150° C. is reached and sulfurous acid gas escapes. Because of foaming one must provide a stirrer to obviate this foaming tendency and sufficient free space to take care of expansion or rising. After approximately ¼ hour the heating may be interrupted. The excess of sulphuric acid can be partly separated from the reaction product, for instance by filtration through acid resistant filters, and can be used again. Residual sulphuric acid is systematically washed out with water.

In this example, the ratio of lignite to sulphuric acid may be changed. The temperature and duration of heating may likewise be changed. With longer heating or heating at higher temperatures more active substances are formed. One can start with lignite of a definite grain size, for example, 1–2 mm., and obtain a reaction product of substantially the same granular size.

Starting, for instance, with charcoal, one may proceed as follows:

50 parts by weight of charcoal are brought together with 100–150 parts by weight of 95 per cent sulphuric acid in which connection no heating takes place. Then, one heats until vigorous $SO_2$ formation occurs which takes place without foaming. After 10–15 minutes the heating is interrupted whereupon one proceeds as stated in the first example.

Instead of concentrated sulphuric acid, more dilute acid of for instance 70–80 per cent may be used, or other strong sulfating reagents, such as chlorosulphonic acid, mono-hydrate ($H_2SO_4$), fuming sulphuric acid or similarly reacting compounds. Fuming sulphuric acid contains $SO_3$ dissolved in mono-hydrated acid. With the stronger reacting compounds the duration of reaction and the temperature used in heating can be adjusted for such stronger reaction.

A large increase in volume of the carbonaceous substance takes place.

In the treatment of wood, for instance, in the form of sawdust, at a certain stage of the treatment there occurs an almost complete homogenization so that the mass looks like a black-brown syrup. In the further treatment, for instance by diluting with water, there is a separation into a non-homogeneous mass and production of solid matter which after washing, then likewise has the above characterized property of ion exchange. The individual solid particles, however, always retain a certain degree of softness.

It is advisable to place the above described homogeneous syrup-like mass either on preferably porous carriers or to let such carriers absorb them prior to the water treatment. It is advisable to select as carriers substances which on contact with acids are also resistant or at least sufficiently resistant, as for example, pumice stone, burnt ceramic bodies such or porcelain, stoneware, chamotte, clay, infusorial earth or other substances having a large surface area, such as activated carbon or silica gel.

After the deposition or impregnation, the substances are given a further finishing treatment as described above. In this connection, there is the advantage that the carrier substances can be employed in the desired grain size of for instance 0.5–1 mm. or 1–2 mm. etc.

Instead of the stated products derived from wood, other suitable carbonaceous humic substances can be deposited on or impregnated in such carriers. By way of example, tar or pitch-like substances can be deposited or impregnated in the carriers and thereafter the acid treatment can be carried out.

Or else, pressed bodies can be made from the finely divided carrier substances such as infusorial earth, or crushed, for instance, pulverized other materials, by using the treated syrup-like wood mass or else the still plastic active wood mass or else other suitable organic substances such as tar or pitch, and these pressed bodies can then be used or further processed, as the case may be.

If, for instance, finely divided humic materials, as, for example, finely divided lignite or charcoal, amongst others, are used for producing the active mass, then by suitable pressing and forming, for instance in an extrusion or string press, permeable filter masses can be produced, preferably by the addition of plastic masses, and especially of the plastic active masses described above. There can also be used as minor materials substances which coagulate on contact with water or acid, for example cellulose xanthogenate (viscose) or else gelatinous silicic acid or silica sols. Always materias are obtained which have the above described ion-exchange and cation extracting properties.

As carrier substances one can also use substances which themselves can be converted into active masses, such as for example charcoal, by permitting them to absorb the syrup-like mass formed for instance by treating wood.

One proceeds, for instance, in such manner that for example, pumice stone or charcoal in grain sizes of 0.5–1–2 mm. is introduced with stirring in such an amount into the syrup-like mass formed by the sulfating treatment of wood so that absorption takes place substantially completely. In this connection further heating may be applied in order to complete the absorption. The mass is then placed in water and washed. The further treatment is carried out as described above. One can also use other carbonaceous waste products.

Finally it has been found that one can also use natural materials impregnated or mixed with carbonaceous humic substances such as bituminous slate.

The preceding description covers the manufacture of ion-exchange products which are formed by treatment of carbonaceous humic materials with sulphuric acid or similarly reacting sulfating agents. These and similar products have the property of retaining the cations from salt solutions in insoluble form, while the anions are left in the filtrate in the form of acids.

If cations have previously been incorporated in the acidic sulfated products, then they are capable of exchanging these cations for the cations of salt solutions with which they come in contact. These properties of the products can be applied to many uses. They may be used especially for the treatment of water in several ways. The substances exchanging hydrogen ions retain completely the cations of any salts in the water so that the effluent water does not contain any cations at all or hardly any and so that merely the anions of the salts having been dissolved in the water are present in the form of acids.

For example, by treating a water containing 2–3 German degrees sulphate hardness (equal to 2.1–3.14 grains hardness per gallon, expressed as $CaCO_3$) in addition to 7–9 German degrees carbonate hardness (equal to 7.45–9.45 grains $CaCO_3$ equivalent per gallon) one obtains a water completely free of hardness that has a pH of less than 3 and in which the anions present in the water are contained as acids, that is, as sulphuric acid, hydrochloric acid and carbonic acid.

If the active sulfated humic materials have been previously charged with alkali metal cations and are then used for the treatment of water, one obtains likewise a water which is free of hardness forming constituents and which now, due to ion exchange, contains the cations previously contained in the materials, for instance sodium ions in lieu of the hardness forming cations of the salts previously present in the water.

In the treatment of water with the hydrogen ion containing sulfated materials, one can thereafter take the acid containing water and free it completely or nearly completely of the acids by thermal or chemical treatments. The carbonic acid is driven off by the thermal treatment whereas the sulphuric acid ions may be precipitated by a chemical treatment if one adds to the water the calculated quantity of barium salts, i. e. such barium salts, the anion of which is water, such as barium hydroxide, or the anion of which is a readily driven off acid, such as barium carbonate. The filtrate from the precipitates obtained is now almost completely free of acid and also free of salts.

If one wants to produce a water containing merely sulphate one can proceed in such manner that after treatment of the water such amount of alkali is added, for instance in the form of caustic soda or soda, that the sulphuric acid is neutralized whereupon, after expelling the carbonic acid, a water is produced containing merely sodium sulphate.

One can, however, also mix the water with a water still containing carbonates and softened either by ion exchange or other methods, and mix the two waters in such ratio that the carbonates of the second water are sufficient to neutralize the sulphuric acid of the first water. By suitable mixing of the waters one has the reduction of the sulphate content under control by merely neutralizing a part of the sulphuric acid and removing the balance by precipitation, or else one can produce a water which still contains certain quantities of carbonates if this is desired. As water softened by ion exchange one can, of course, also use a water which has been obtained by treating the water with the active materials which have been charged with alkali ions.

In case it should be required that the water shall contain a certain sulphate hardness one can also proceed in such manner that the free sulphuric acid is neutralized with lime or calcium carbonate whereupon one proceeds as described above in connection with the treatment with barium salts. One then obtains a water which contains calcium sulphate the quantity of which one can likewise vary in accordance with the manner described above. Such water containing sulphate is preferred for brewing purposes.

One can also transform the sulphuric acid left in the water into sulphate hardness by passing the water which contains free sulphuric acid and carbonic acid, so quickly over marble (calcium carbonate) that only the sulphuric acid is neutralized by the marble whereas the carbonic acid (which, as known, reacts but slowly with marble) does not react with the marble at all or only to a negligible extent.

One may also proceed to good advantage in such manner that the water is passed at such flow rate through the active materials or that it is left in contact with such materials for so short a period of time that no complete softening of the water takes place, for instance only down to such degree of hardness as corresponds to the sulphate hardness; for instance a water containing three degrees (3.14 grains $CaCO_3$ equivalent per gallon) of sulphate hardness in addition to its carbonate hardness would be softened down to three degrees (3.14 grains per gallon) of total hardness. After boiling off the $CO_2$ one then has a water containing merely calcium sulphate.

In place of marble one may also use other alkaline earth carbonates if one wants other hardness forming constituents in the water especially natural alkaline earth carbonates such as dolomite and magnesite. In place of the natural carbonates one can also use artificial carbonates, for example precipitated calcium carbonate or caustic lime or magnesium carbonate or both.

If the calcium sulphate hardness of the water produced in this manner is insufficient for a suitable brewery water, then such calcium sulphate hardness can be increased by dissolving gypsum in the water, for instance by passing the water over the mineral, gypsum, or else one may obtain a water with higher calcium sulphate content by adding amounts of free sulphuric acid corresponding to the desired calcium sulphate hardness and treating such water now containing larger amounts of sulphuric acid in the manner described above.

For example, over 100 parts by volume of a sulfated product, produced as described ante, one passes a water containing 2–3 German degrees calcium sulphate hardness and 7–9 German degrees carbonate hardness, (approximately 3 grains per gallon sulfate hardness and 8 grains per gallon carbonate hardness, both calculated as $CaCO_3$) at such a flow rate that in one hour 5–10 times the amount of water passes through the filter as compared with the quantity of material used, that is that when for example using one litre of the active material, 5–10 litres of water are passed through per hour. The flow rate at which the water is passed through depends upon the grain size of the material and can be further increased when using finely divided material, whereas with very coarse granular material a reduction in the rate of flow is found desirable. For instance, the quantity of water treated by one litre of the active material amounts to about 100 times the volume of material used. With the above stated composition, the water has a pH of less than 3 and upon a test for dissolved solids is found completely or nearly completely free of salts.

The exhausted material is regenerated by treatment with an acid that forms readily soluble or at least not difficultly soluble salts especially calcium salts, for which reason hydrochloric acid is preferred which may be used in the raw condition. The concentration of the hydrochloric acid should correspond to a pH value of about 1 or a less acidity and its concentration must in any case be greater than the pH of the active substance since otherwise, the alkaline earths which have been taken up are not given up again. After treatment with hydrochloric acid and washing the active substance can again be used for further treatment.

If one is using an active material loaded with alkali ions, such as sodium ions, then an ion exchange takes place in a manner like that with other known ion exchange materials. The working principle is exactly the same as stated in the above described example with the difference that the water obtained contains the alkali salt in quantities corresponding to the alkaline earth salts. In this case regeneration is carried out with an alkali salt solution, for example, sodium chloride or sodium sulphate solution, followed by washing out such solution, whereupon the active material is again capable of further ion exchange. The base exchange capacity corresponds to that stated in the above example.

The active material also splits alkali salts, that is retains alkali metal ions so that even alkali salt solutions may be freed of their cations and by acid treatment of the active material the removal of the alkali ion or regeneration can be obtained. Similarly other ions of the heavy or light metals can be retained by the active material by means of which the material can then be used for all such treatments as result from the nature of the substances and the salts. In this connection it becomes possible for instance to systematically transform the salt of one acid into salts of another acid, or the salt of one acid into another salt of the same acid. By re-using the new salt solution so obtained, which may even be acid, the salt content of a solution may be steadily increased.

A further possible procedure is to subject the water which still contains sulphate hardness after treatment with the active substances, to a further treatment by ion exchange materials, which likewise may consist of the active sulfated material, for the purpose of complete softening and in order to transform the sulphate hardness into sodium sulphate, if necessary after having first removed the carbonic acid. This treatment can also be carried out in a filter which, for instance, contains in its upper portion active materials treated with acids and in its lower portion active materials containing sodium ions. Such a mass, although not stratified, yet similar in effect, can be obtained by treating or regenerating the active substances with an acid sodium chloride solution.

By the term "member of the coal family" used in certain of the claims is meant the usual black coals and lignites that are known also as brown coal.

What I claim is:

1. The cyclic process of removing cations from water containing dissolved salts which comprises flowing the water through a bed of a granular water-insoluble oxidized and sulfated solid, ion-exchanging conversion product made by treating a carbonaceous material selected from the class consisting of wood, peat, lignite, charcoal, coals, cokes, tar and pitch with a concentrated sulfating reagent until the ion exchanging capacity of said sulfated conversion product is substantially improved, regenerating the bed by an acid wash, and re-using the acid-regenerated material for treating a further flow of water.

2. A process of treating hard water containing dissolved salts including a sulfate to obtain softened water containing principally sulfates which comprises first treating the water with a granular ion-exhanging material made by treating carbonaceous material with a concentrated sulfating agent to substantially increase the replaceable hydrogen content thereof and subsequently adding an alkaline salt to the treated water to neutralize sulfuric acid formed in the first treatment.

3. In treating hard water to obtain water containing alkali metal sulfate, a cyclic process which comprises first treating hard water with a granular ion-exchanging material made by treating carbonaceous material with a concentrated sulfating agent to substantially increase the replaceable hydrogen content thereof, regenerating the product with solutions of an acid and an alkali metal salt, treating hard water with the regenerated product, and repeating the acid-salt regeneration and hard water treatment.

4. In water softening, a process of producing neutral soft water which comprises first removing bases from hard water and softening it by bringing the water into contact with insoluble sulfated humic material containing exchangeable hydrogen and subsequently bringing the water into contact with base-exchange material containing exchangeable alkali metal ion, the sulfated humic material being regenerated for re-use by an acid wash and the base-exchange material being regenerated by an alkali metal salt wash.

5. In the treatment of hard water containing calcium sulphate, the steps comprising removing cations of salts from such water by making a quick contact thereof with an acid treated granular carbonaceous ion-exhanging material, and removing the water from contact before all the sulphate hardness is removed.

6. Process according to claim 5 characterized by the fact that the water containing calcium sulphate is thereafter treated with a second ion-exchange substance charged with alkali metal which exchanges this alkali metal for the calcium ions remaining in the water.

7. A cyclic process of treating hard water which comprises flowing the water in contact with a granular sulphated coal capable of withdrawing cations therefrom, and regenerating the sulphated humic material with a solution containing an acid and an alkali metal salt.

8. The process for removing the bases of dissolved salts from water comprising the step of subjecting the water to the action of an oxidized sulfated carbonaceous material having an acidic hydrogen content, said sulfated oxidized carbonaceous material being formed by reacting a carbonaceous material selected from the group consisting of bituminous coal, lignite coal, peat and coke with a reagent selected from the group consisting of 100 per cent sulfuric acid, fuming sulfuric acid, dilute sulfuric acid, at a temperature in the range between 70° C. and 150° C.

9. The process of reducing the dissolved solids content of a water containing a bicarbonate which comprises contacting the water with a granular, insoluble, acid resistant carbonaceous material having a high capacity for ion-exchange and containing replaceable hydrogen to exchange the hydrogen for the positive ion of the bicarbonate and subsequently removing carbon dioxide from the treated water.

10. A process as defined in claim 1 in which hard water is contacted with the product to soften said water and reduce the total solids content thereof.

11. A process of softening water comprising flowing hard water into contact with a granular insoluble product made by treating carbonaceous material selected from the class consisting of wood, peat, lignite, charcoal, coals, cokes, tar and pitch with a concentrated sulfating agent to substantially improve the ion-exchange power thereof, interrupting said flow of water, regenerating said product with an aqueous solution of an alkali metal salt, and repeating the treatment of hard water.

12. The cyclic process of removing cations from water containing dissolved salts which comprises flowing the water through a bed of a granular water insoluble oxidized and sulfated solid, ion-exchanging conversion product made by treating a member of the coal family with a concentrated sulfating reagent until the ion-exchange capacity of the product is substantially improved, regenerating the bed with an acid wash, and reusing the acid-regenerated material for treating a further flow of water.

13. A process of softening water comprising flowing hard water into contact with a granular insoluble product made by treating a member of the coal family with a concentrated sulfating agent to improve substantially the ion-exchange power thereof, interrupting said flow of water, regenerating said product with an aqueous solution of an alkali metal salt, and repeating the treatment of hard water.

14. The cyclic process of removing cations from an aqueous solution in exchange for hydrogen ions which comprises bringing the solution into contact with extensive surfaces of a water insoluble solid, ion-exchanging conversion product made by treating a carbonaceous material selected from the class consisting of wood, peat, lignite, charcoal, coals, cokes, tar and pitch with a sufficient quantity of a concentrated sulfating reagent to enhance substantially the ion-exchanging capacity thereof, regenerating said conversion product with an acid wash, and reusing the acid-regenerated material for removing cations from additional quantities of aqueous solution.

15. The cyclic process of removing cations from an aqueous solution in exchange for hydrogen ions which comprises bringing the solution into contact with extensive surfaces of a water insoluble solid, ion-exchanging conversion product made by treating a member of the coal family with a sufficient quantity of a concentrated sulfating reagent to enhance substantially the ion-exchanging capacity thereof, regenerating said conversion product with an acid wash, and reusing the acid-regenerated material for removing cations from additional quantities of aqueous solution.

OTTO LIEBKNECHT.

---

CERTIFICATE OF CORRECTION.

Patent No. 2,206,007.　　　　　　　　　　　　　　　June 25, 1940.

OTTO LIEBKNECHT.

It is hereby certified that error appears in the printed specification of the above numbered patent requiring correction as follows: Page 4, first column, line 11, for the word "base" read --ion--; page 3, for the patent number "2,262,007" at top of page, read --2,206,007--; page 5, top of page, for "2,205,007" read --2,206,007--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.

CERTIFICATE OF CORRECTION.

Patent No. 2,206,007.                                          June 25, 1940.

OTTO LIEBKNECHT.

It is hereby certified that error appears in the printed specification of the above numbered patent requiring correction as follows: Page 4, first column, line 11, for the word "base" read --ion--; page 3, for the patent number "2,262,007" at top of page, read --2,206,007--; page 5, top of page, for "2,205,007" read --2,206,007--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.